US010037050B2

(12) United States Patent
Lin et al.

(10) Patent No.: US 10,037,050 B2
(45) Date of Patent: Jul. 31, 2018

(54) ELECTRONIC DEVICE HAVING STAND

(71) Applicants: Chia-Chi Lin, Taipei (TW); Wei-Hao Lan, Taipei (TW); Tsai-Yu Lin, Taipei (TW); Jyh-Chyang Tzou, Taipei (TW); Hsin Yeh, Taipei (TW); Tzu-Fang Huang, Taipei (TW)

(72) Inventors: Chia-Chi Lin, Taipei (TW); Wei-Hao Lan, Taipei (TW); Tsai-Yu Lin, Taipei (TW); Jyh-Chyang Tzou, Taipei (TW); Hsin Yeh, Taipei (TW); Tzu-Fang Huang, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 15/641,305

(22) Filed: Jul. 4, 2017

(65) Prior Publication Data
US 2018/0052487 A1 Feb. 22, 2018

Related U.S. Application Data

(60) Provisional application No. 62/376,378, filed on Aug. 17, 2016.

(51) Int. Cl.
*G06F 1/16* (2006.01)

(52) U.S. Cl.
CPC .......... *G06F 1/1615* (2013.01); *G06F 1/1624* (2013.01); *G06F 1/1656* (2013.01); *G06F 1/1626* (2013.01)

(58) Field of Classification Search
CPC combination set(s) only.
See application file for complete search history.

(56) References Cited

U.S. PATENT DOCUMENTS 6,034,866 A * 3/2000 Nobuchi ............ G06F 1/1626
248/298.1
6,129,237 A * 10/2000 Miyahara ........... B65D 43/165
220/255
6,134,103 A * 10/2000 Ghanma ............... F16M 11/24
248/917

(Continued)

FOREIGN PATENT DOCUMENTS

CN 102123573 7/2011
TW M292097 6/2006

(Continued)

OTHER PUBLICATIONS

"Office Action of Taiwan Counterpart Application," dated Dec. 13, 2017, p. 1-p. 6.

*Primary Examiner* — Lisa Lea Edmonds
(74) *Attorney, Agent, or Firm* — JCIPRNET

(57) ABSTRACT

An electronic device includes a body, a stand and a sliding member. The stand is rotatably connected to the body. The sliding member is slidably disposed on the body and has at least one stopping portion and at least one pushing portion. When the sliding member is located at a first position, the stopping portion interferes with the stand to stop the stand from expanding from the body. When the sliding member slides relative to the body to be away from the first position, the stopping portion releases the stand and the pushing portion pushes the stand to drive the stand to rotate and expand from the body.

15 Claims, 8 Drawing Sheets

(56) References Cited

U.S. PATENT DOCUMENTS

| | | | | |
|---|---|---|---|---|
| 8,111,512 B2* | 2/2012 | Yeh | ............ | G06F 1/1624 |
| | | | | 345/156 |
| 8,649,166 B2* | 2/2014 | Wu | ............ | G06F 1/1601 |
| | | | | 361/679.27 |
| 8,879,250 B2* | 11/2014 | Franz | ............ | F16M 11/10 |
| | | | | 345/211 |
| 8,902,575 B2* | 12/2014 | Zhou | ............ | F16M 11/041 |
| | | | | 248/127 |
| 8,964,376 B2* | 2/2015 | Chen | ............ | G06F 1/1656 |
| | | | | 292/169.17 |
| 9,036,347 B2* | 5/2015 | Kuo | ............ | F16M 11/10 |
| | | | | 361/679.59 |
| 9,535,453 B2* | 1/2017 | Dong | ............ | G06F 1/1626 |
| 9,565,909 B2* | 2/2017 | Song | ............ | A45C 11/00 |
| 9,717,314 B2* | 8/2017 | Idehara | ............ | A45C 11/00 |
| 2013/0286600 A1* | 10/2013 | Yu | ............ | H05K 5/0217 |
| | | | | 361/727 |

FOREIGN PATENT DOCUMENTS

| | | |
|---|---|---|
| TW | M518458 | 3/2016 |
| TW | 201629678 | 8/2016 |

\* cited by examiner

ELECTRONIC DEVICE HAVING STAND

CROSS-REFERENCE TO RELATED APPLICATION

This application claims the priority benefits of U.S. provisional application Ser. No. 62/376,378, filed on Aug. 17, 2016. The entirety of the above-mentioned patent application is hereby incorporated by reference herein and made a part of this specification.

BACKGROUND OF THE INVENTION

Field of the Invention

The invention relates to an electronic device, and particularly relates to an electronic device having a stand.

Description of Related Art

Along with quick development of electronics industry, flat panel displays have gradually become a mainstream in the market of displays. In the flat panel displays, a liquid crystal display technique is the most mature and popular, which can be applied to electronic devices such as notebook computers, tablet personal computers (PCs), smart phones, etc.

In order to facilitate a user to comfortably view a display image of the electronic device, a stand can be configured at a back surface of the electronic device. The stand can be expanded to support the electronic device on a desktop or user's lap top, such that a display surface of the electronic device has a suitable tilt angle to facilitate user's viewing. Generally, when the user wants to use the stand of the electronic device, the user needs to directly pull the stand by hand to expand the stand from a body of the electronic device, though such operation method is inconvenient in usage.

SUMMARY OF THE INVENTION

The invention is directed to an electronic device, and a stand thereof is convenient in usage.

The invention provides an electronic device including a body, a stand and a sliding member. The stand is rotatably connected to the body. The sliding member is slidably disposed on the body and has at least one stopping portion and at least one pushing portion. When the sliding member is located at a first position, the stopping portion interferes with the stand to stop the stand from expanding from the body. When the sliding member slides relative to the body to move away from the first position, the stopping portion releases the stand and the pushing portion pushes the stand to drive the stand to rotate and expand from the body.

In an embodiment of the invention, when the sliding member slides relative to the body to move from the first position to a second position, the stopping portion releases the stand and the pushing portion contacts the stand, and when the sliding member slides relative to the body to move from the second position to a third position, the pushing portion pushes the stand to drive the stand to rotate and expand from the body.

In an embodiment of the invention, the second position is located between the first position and the third position.

In an embodiment of the invention, the stand has a recess portion, and when the sliding member is located at the first position, the stopping portion inserts into the recess portion.

In an embodiment of the invention, the stand has a convex portion, and the pushing portion is adapted to push the convex portion to drive the stand to rotate and expand from the body.

In an embodiment of the invention, the stand has a free end, and the stand is adapted to rotate relative to the body along a rotation axis to make the free end to be away from the body, and the convex portion is located between the rotation axis and the free end.

In an embodiment of the invention, the electronic device includes an elastic member, where the elastic member is configured on the body, and when the sliding member is located at the first position, the stand contacts the elastic member, and resists an elastic force of the elastic member for closing to the body, and when the sliding member moves away from the first position, the stand is adapted to expand from the body through the elastic force of the elastic member.

In an embodiment of the invention, the electronic device includes a magnetic member set, where the magnetic member set is configured between the sliding member and the stand or between the body and the stand, and the magnetic member set is adapted to generate a magnetic attraction force to stop the stand from expanding from the body, or adapted to generate a magnetic repulsion force to drive the stand to expand from the body.

In an embodiment of the invention, the magnetic member set includes two magnetic members, and the two magnetic members are respectively configured on the sliding member and the stand, and when the sliding member is located at the first position, the two magnetic members are aligned to each other to generate the magnetic attraction force.

In an embodiment of the invention, the magnetic member set includes two magnetic members, and the two magnetic members are respectively configured on the body and the stand, and the two magnetic members are aligned to each other to generate the magnetic attraction force.

In an embodiment of the invention, the magnetic member set includes two magnetic members, and the two magnetic members are respectively configured on the sliding member and the stand, and when the sliding member moves away from the first position, the two magnetic members are aligned to each other to generate the magnetic repulsion force.

In an embodiment of the invention, the sliding member is a cover and coves at least a part of a back surface of the body.

In an embodiment of the invention, the sliding member has two sliding portions, and the two sliding portions are respectively and slidably disposed on two end portions of the body opposite to each other.

In an embodiment of the invention, the electronic device includes a linkage mechanism, where the linkage mechanism is connected between the two sliding portions and the body to make the two sliding portions to side synchronously.

In an embodiment of the invention, the stand includes a first section and a second section. An end of the first section is rotatably connected to the body, and the second section is rotatably connected to another end of the first section.

According to the above description, in the electronic device of the invention, the sliding member is disposed on the body, and the sliding member has the stopping portion used for stopping the stand and the pushing portion used for pushing the stand. When the user does not use the stand, the sliding member can be located at the first position on the body, and the stopping portion of the sliding member limits the stand to be unable to expand from the body, so as to avoid unexpected expansion of the stand. When the user wants to use the stand, the user moves the sliding member away from the first position, such that the stopping portion of the sliding member releases the stand and the pushing portion of the sliding member pushes the stand to expand from the body. Namely, the user may operate the sliding member to make the stand to automatically expand from the body without directly pulling the stand by hand, such that usage convenience of the stand is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
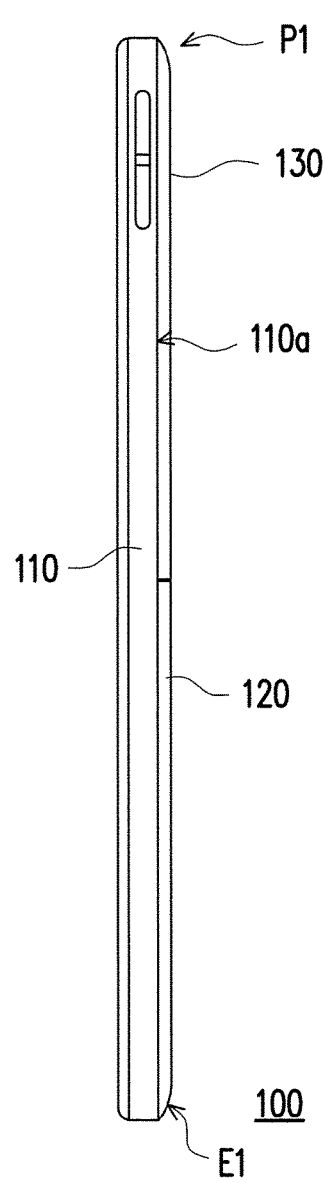
FIG. 1A is a side view of an electronic device according to an embodiment of the invention.
Figure 1B:
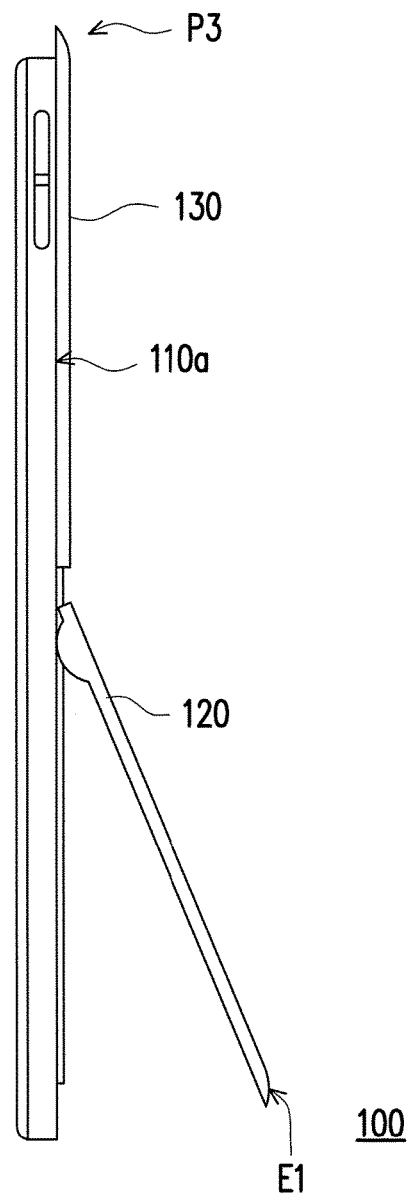
FIG. 1B illustrates a situation that a stand of FIG. 1A expands from a body.

FIG. 1A is a side view of an electronic device according to an embodiment of the invention. FIG. 1B illustrates a situation that a stand of FIG. 1A expands from a body. Referring to FIG. 1A and FIG. 1B, the electronic device 100 of the present embodiment is, for example, a tablet personal computer, and includes a body 110, a stand 120 and a sliding member 130. The stand 120 is rotatably connected to the body 110. The sliding member 130 is slidably disposed on the body 110, and is adapted to be in a position shown in FIG. 1 to limit the stand 120 to a close state, and the sliding member 130 is adapted to slide to a position shown in FIG. 2 relative to the body 110 to drive the stand 120 to expand from the body 110. The function of the sliding member 130 is described in detail below.

Figure 2:
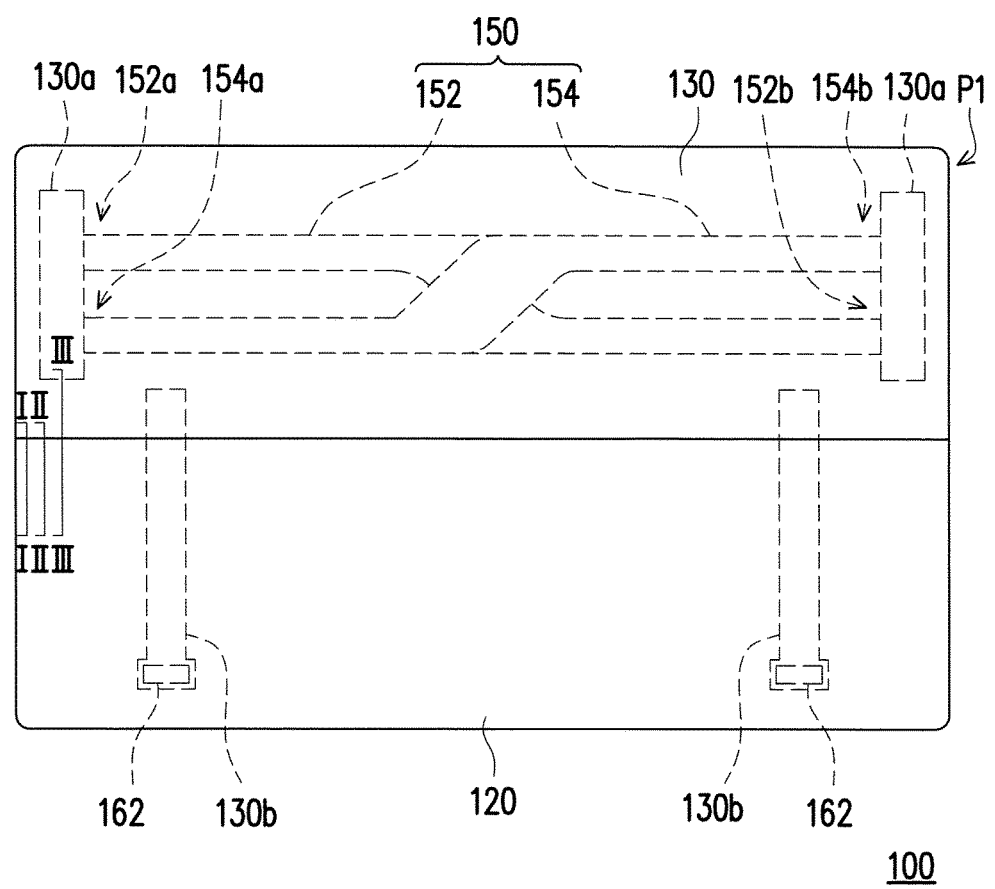
FIG. 2 is a back view of the electronic device of FIG. 1A.
Figure 3A:
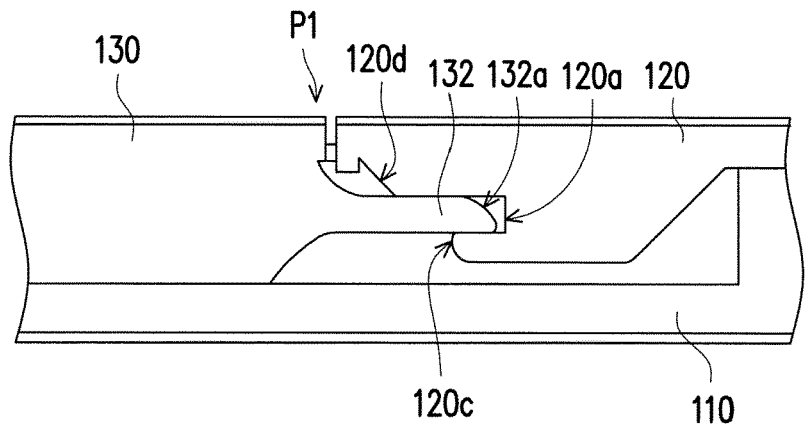
FIG. 3A is a partial cross-sectional view of the electronic device of FIG. 2 viewing along a section line I-I.
Figure 4A:
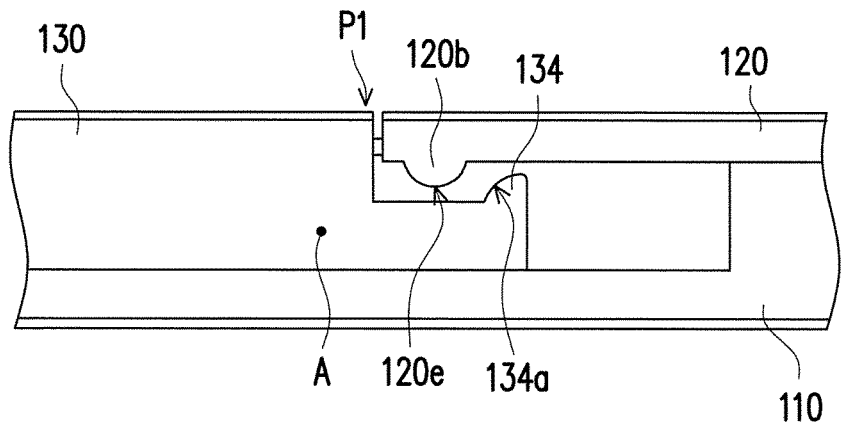
FIG. 4A is a partial cross-sectional view of the electronic device of FIG. 2 viewing along a section line II-II.

FIG. 2 is a back view of the electronic device of FIG. 1A. FIG. 3A is a partial cross-sectional view of the electronic device of FIG. 2 viewing along a section line I-I. FIG. 4A is a partial cross-sectional view of the electronic device of FIG. 2 viewing along a section line II-II. Referring to FIG. 2, FIG. 3A and FIG. 4A, the sliding member 130 of the present embodiment has at least one stopping portion 132 and at least one pushing portion 134. When the sliding member 130 is located at a first position P1, the stopping portion 132 interferes with the stand 120 as that shown in FIG. 3A to stop the stand 120 from expanding from the body 110, and the pushing portion 134 does not contact the stand 120 as that shown in FIG. 4A.

Figure 3B:
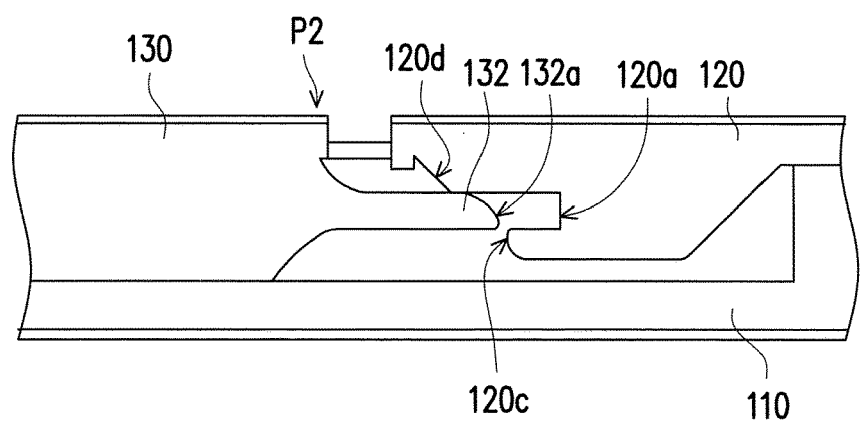
FIG. 3B and FIG. 3C illustrate a situation that a sliding member of FIG. 3A moves away from a first position.
Figure 3C:
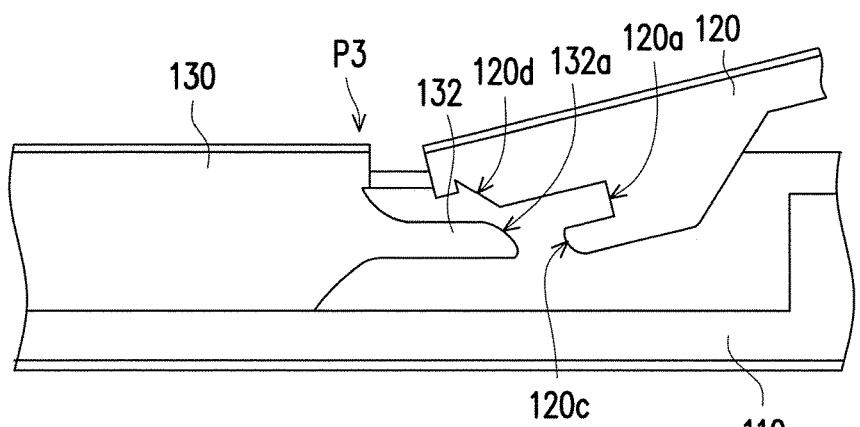
Figure 4B:
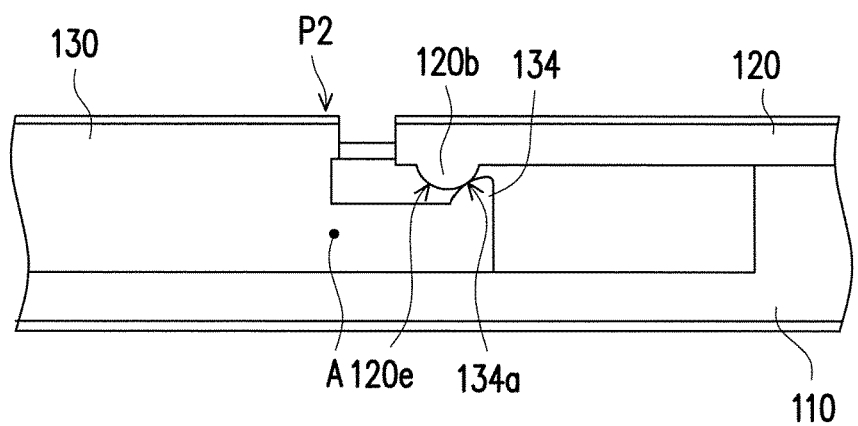
FIG. 4B and FIG. 4C illustrate a situation that a sliding member of FIG. 4A moves away from a first position.
Figure 4C:
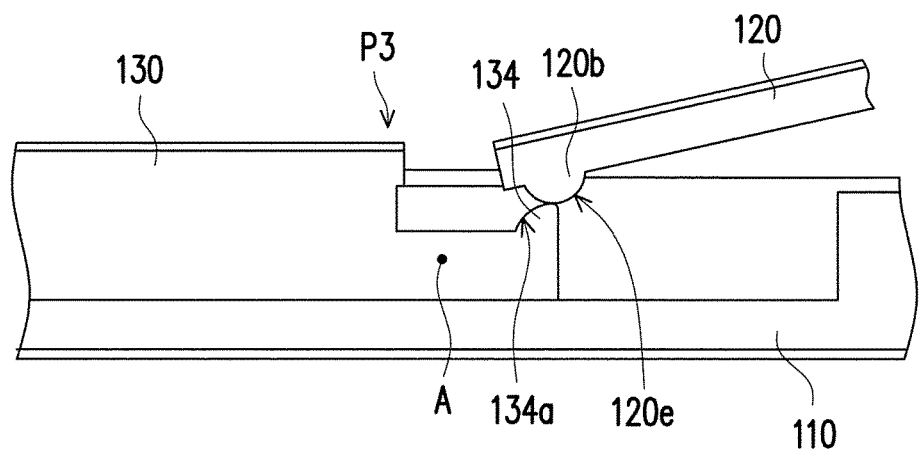

FIG. 3B and FIG. 3C illustrate a situation that the sliding member of FIG. 3A moves away from the first position. FIG. 4B and FIG. 4C illustrate a situation that the sliding member of FIG. 4A moves away from the first position. When the sliding member 130 slides relative to the body 110 to move away from the first position P1 to reach a second position P2 shown in FIG. 3B and FIG. 4B, the stopping portion 132 releases the stand 120 and the pushing portion 134 contacts the stand 120. Then, when the sliding member 130 continually slides relative to the body 110 to move from the second position P2 to a third position P3 shown in FIG. 3C and FIG. 4C, the pushing portion 134 pushes the stand 120 to drive the stand 120 to rotate and expand from the body 110, and the electronic device 100 becomes a state shown in FIG. 1B. In the present embodiment, the sliding member 130 first moves from the first position P1 to the second position P2, and then moves from the second position P2 to the third position P3. Namely, the second position P2 is located between the first position P1 and the third position P3.

According to the above configuration and operation method, when the user does not use the stand 120, the user may slide the sliding member 130 to the first position P1 on the body 110, and the stopping portion 132 of the sliding member 130 limits the stand 120 to be unable to expand from the body 110, so as to avoid unexpected expansion of the stand 120. When the user wants to use the stand 120, the user moves the sliding member 130 away from the first position P1, such that the stopping portion 132 of the sliding member 130 releases the stand 130 and the pushing portion 134 of the sliding member 130 pushes the stand 120 to expand from the body 110. Namely, the user may operate the sliding member 130 to make the stand 120 to automatically expand from the body 110 without directly pulling the stand 120 by hand, such that usage convenience of the stand 120 is improved.

As shown in FIG. 3A, the stand 120 of the present embodiment has a recess portion 120a, and when the sliding member 130 is located at the first position P1, the stopping portion 132 of the sliding member 130 inserts into the recess portion 120a of the stand 120 to stop rotation of the stand 120. Further, the stand 120 has guide surfaces 120c, 120d located adjacent to the recess portion 120a, and the stopping portion 132 of the sliding member 130 has a guide surface 132a, and the stopping portion 132 can be smoothly inserted into the recess portion 120a through guidance of the guide surfaces 120c, 120d and 132a. The guide surfaces 120c, 120d and 132a can be bevel or arc surfaces, which is not limited by the invention. Moreover, in other embodiments, the sliding member 130 and the stand 120 can be interfered with each other through other types of structures, which is not limited by the invention.

As shown in FIG. 4C, the stand 120 has a convex portion 120b, and the pushing portion 134 of the sliding member 130 is adapted to push the convex portion 120b of the stand 120 to drive the stand 120 to rotate and expand from the body 110. Further, the convex portion 120b of the stand 120 has a guide surface 120e, and the pushing portion 134 of the sliding member 130 has a guide surface 134a, and the pushing portion 134 may smoothly push the convex portion 120b through guidance of the guide surfaces 120e and 134a. The guide surfaces 120e and 134a can be bevel or arc surfaces, which is not limited by the invention. Moreover, in other embodiments, the sliding member 130 and the stand 120 can be interfered with each other through other types of structures, which is not limited by the invention.

In the present embodiment, the stand 120 has a free end E1 (indicated in FIG. 1A and FIG. 1B), and the stand 120 is adapted to rotate relative to the body 110 along a rotation axis A (indicated in FIG. 4A to FIG. 4C). The convex portion 120b of the stand 120 is located between the rotation axis A and the free end E1, such that when convex portion 120b of the stand 120 is pushed by the pushing portion 134 of the sliding member 130 to drive the stand 120 to rotate along the rotation axis A, the free end E1 can be away from the body 110 as that shown in FIG. 1B.

Figure 5:
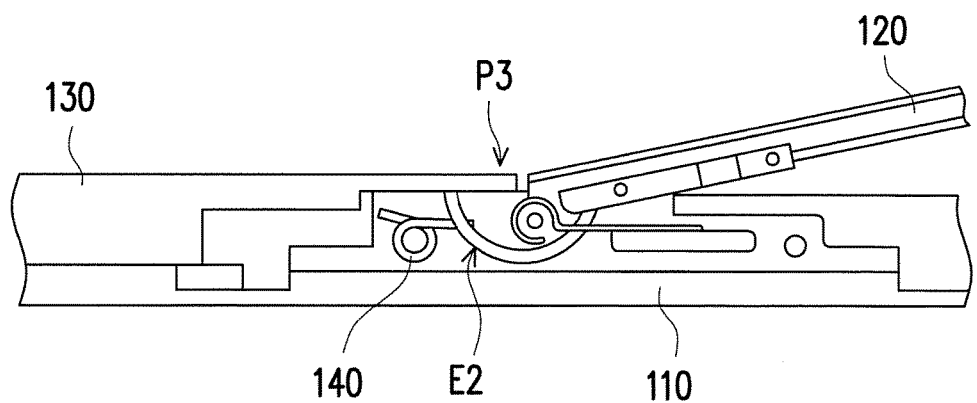
FIG. 5 illustrates a situation that a stand of FIG. 2 expands through an elastic force of an elastic member.

FIG. 5 illustrates a situation that the stand of FIG. 2 expands through an elastic force of an elastic member, and FIG. 5 is a cross-sectional view of FIG. 2 viewing along a section line III-III. In the present embodiment, the electronic device 100 further includes an elastic member 140 shown in FIG. 5, and the elastic member 140 is, for example, a torsion spring and is disposed on the body 110. When the sliding member 130 is located at the first position P1, the stopping portion 132 of the sliding member 130 interferes with the stand 120, and the stand 120 contacts the elastic member 140, and resists an elastic force of the elastic member 140 for closing to the body 110, i.e. the electronic device 100 is in the close state shown in FIG. 1. When the sliding member 130 moves away from the first position P1 to reach the third position P3, the stand 120 is adapted to expand from the body 110 through the elastic force of the elastic member 140 as that shown in FIG. 5. The elastic member 140, for example, presses down an end E2 of the stand 120 through the elastic force to drive the stand 120 to spread.

Referring to FIG. 1A and FIG. 2, in the present embodiment, the sliding member 130 is a cover, and covers at least a part of a back surface 110a of the body 110 (which is illustrated as that the sliding member 130 covers an upper part of the back surface 110a of the body 110). Moreover, the sliding member 130 has two sliding portions 130a as shown in FIG. 2, and the two sliding portions 130a are respectively and slidably disposed on two end portions of the body 110 opposite to each other. The electronic device 100 further includes a linkage mechanism 150, and the linkage mechanism 150 is connected between the two sliding portions 130a and the body 110, such that the two sliding portions 130a may side synchronously. To be specific, the linkage mechanism 150 includes two connection rods 152 and 154. One end 152b of the connection rod 152 and one end 154a of the connection rod 154 are, for example, pivotally connected to the body 110, and another end 152a of the connection rod 152 and another end 154b of the connection rod 154 are, for example, respectively and slidably disposed on the two sliding portions 130a of the sliding member 130. In other embodiments, the linkage mechanism 150 may have other proper structure, which is not limited by the invention.

Figure 6A:
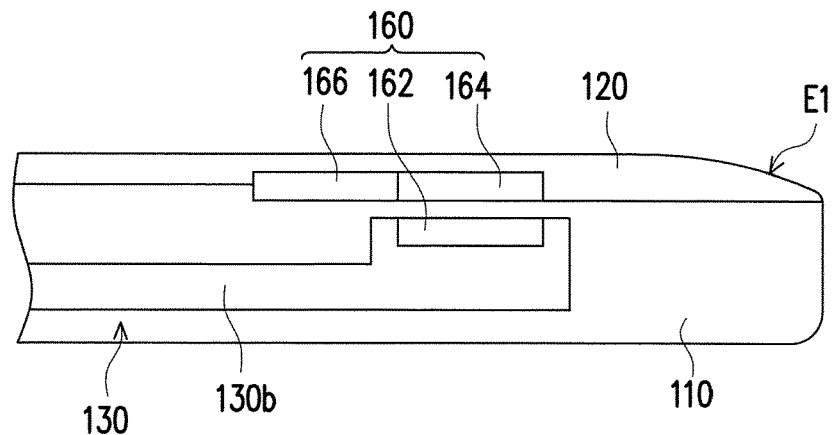
FIG. 6A is a partial schematic diagram of the electronic device of FIG. 1A.

FIG. 6A is a partial schematic diagram of the electronic device of FIG. 1A. Referring to FIG. 2 and FIG. 6A, the electronic device 100 of the present embodiment further includes a magnetic member set 160, and the magnetic member set 160 includes two magnetic members 162, 164. The magnetic members 162, 164 are respectively disposed on an extending portion 130b of the sliding member 130 and the stand 120, and are located between the sliding member 130 and the stand 120. When the sliding member 130 is located at the first position P1 (indicated in FIG. 1A), the two magnetic members 162 and 164 are aligned to each other to generate a magnetic attraction force, so as to stop the stand 120 from expanding from the body 110. Namely, in the present embodiment, besides that the stopping portion 132 of the sliding member 130 is used to prevent the stand 120 from expanding from the body 110 as shown in FIG. 3A, the stand 120 is also stopped from expanding from the body 110 through the magnetic attraction force between the two magnetic members 162 and 164.

Figure 6B:
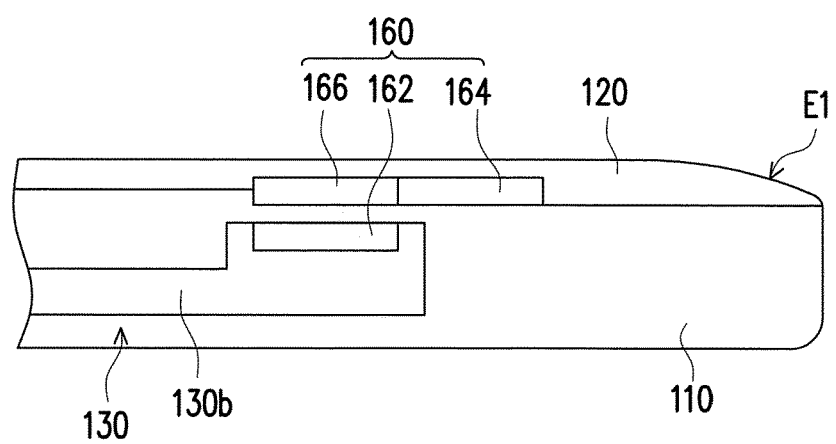
FIG. 6B illustrates movement of a sliding member of FIG. 6A.

FIG. 6B illustrates movement of the sliding member of FIG. 6A. The magnetic member set 160 further includes a magnetic member 166, and the magnetic member 166 is disposed on the stand 120. When the sliding member 130 moves away from the first position P1 (indicated in FIG. 1A) to reach the third position P3 (indicated in FIG. 1B), the two magnetic members 162 and 166 are aligned to each other to generate a magnetic repulsion force, so as to drive the stand 120 to expand from the body 110. Namely, in the present embodiment, besides that the pushing portion 134 of the sliding member 130 shown in FIG. 4C and the elastic member 140 shown in FIG. 5 are used to drive the stand 120 to expand from the body 110, the magnetic repulsion force between the two magnetic members 162 and 166 is also used to drive the stand 120 to expand from the body 110.

Figure 7:
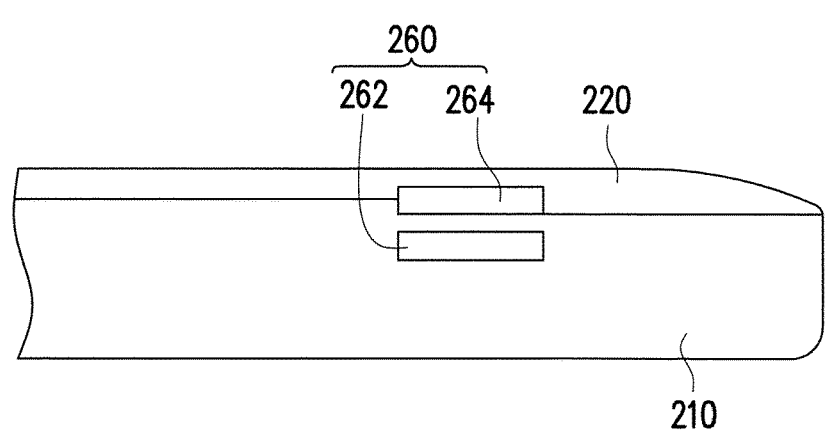
FIG. 7 is a partial schematic diagram of an electronic device according to another embodiment of the invention.

FIG. 7 is a partial schematic diagram of an electronic device according to another embodiment of the invention. Configurations and function methods of a body 210 and a stand 220 shown in FIG. 7 are similar to that of the body 110 and the stand 120 shown in FIG. 6A, and details thereof are not repeated. A difference between the embodiment of FIG. 7 and the embodiment of FIG. 6A is that a magnetic member set 260 only includes two magnetic members 262 and 264, and the two magnetic members 262 and 264 are respectively disposed on the body 210 and the stand 220 to locate between the body 210 and the stand 220. The two magnetic members 262 and 264 are aligned to generate the magnetic attraction force, and since the magnetic member 262 is configured on the body 210 rather than on the sliding member, the magnetic member 262 does not move relative to the magnetic member 264 along with movement of the sliding member.

Figure 8A:
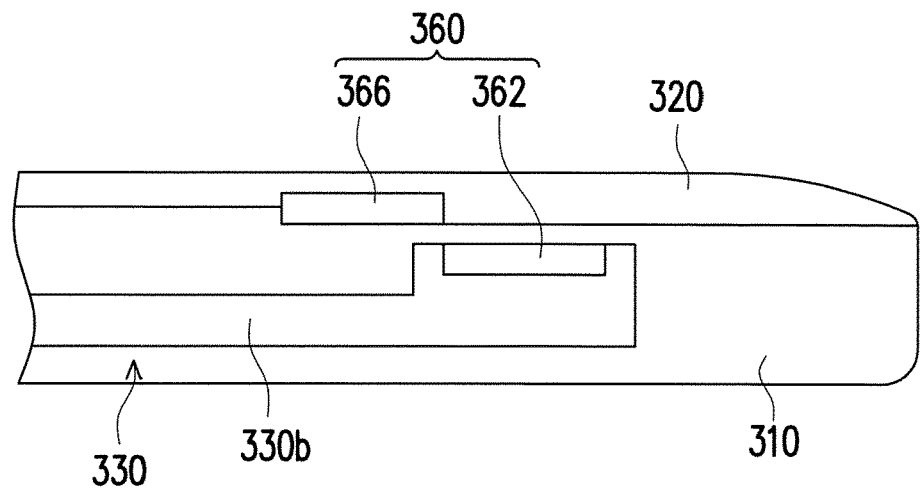
FIG. 8A is a partial schematic diagram of an electronic device according to another embodiment of the invention.
Figure 8B:
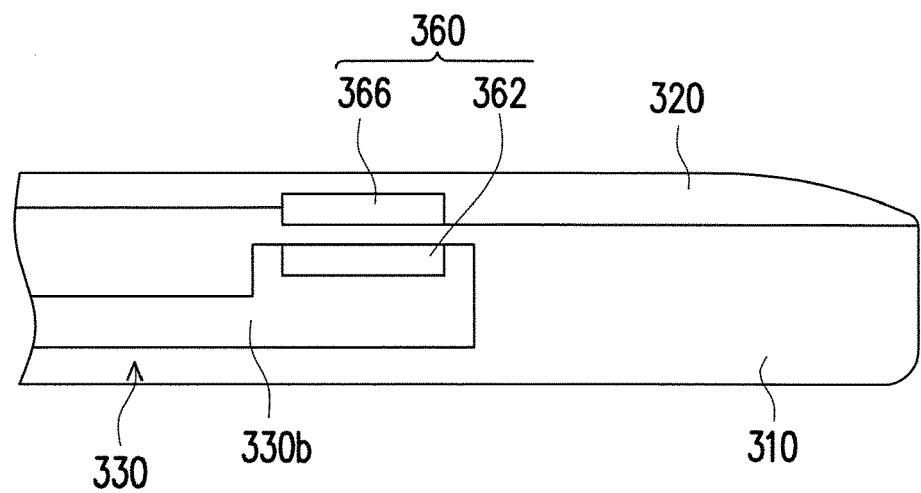
FIG. 8B illustrates movement of a sliding member of FIG. 8A.

FIG. 8A is a partial schematic diagram of an electronic device according to another embodiment of the invention. FIG. 8B illustrates movement of the sliding member of FIG. 8A. Configurations and function methods of a body 310, a stand 320, a sliding member 330, an extending portion 330b, a magnetic member 362 and a magnetic member 366 of FIG. 8A and FIG. 8B are similar to that of the body 110, the stand 120, the sliding member 130, the extending member 130b, the magnetic member 162 and the magnetic member 166 of FIG. 6A and FIG. 6B, so that details thereof are not repeated. A difference between the embodiment of FIG. 8A and FIG. 8B and the embodiment of FIG. 6A and FIG. 6B is that a magnetic member set 360 only includes two magnetic members 362, 366 without including the magnetic member 164 shown in FIG. 6A and FIG. 6B. Namely, when the electronic device is in the state shown in FIG. 8A, the magnetic member set 360 does not generate the magnetic attraction force to prevent expanding of the stand 320.

Figure 9A:
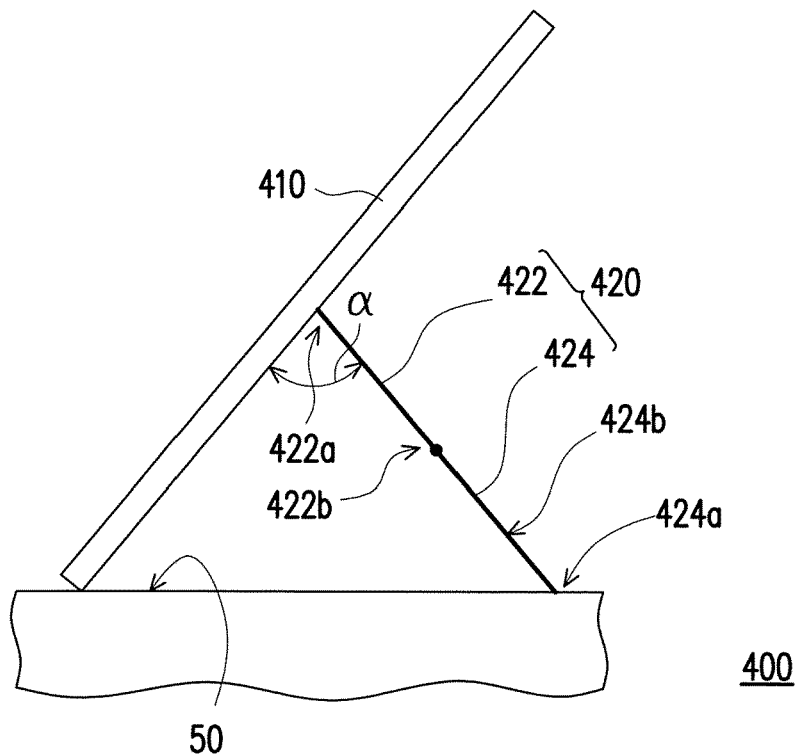
FIG. 9A is a schematic diagram of an electronic device according to another embodiment of the invention.
Figure 9B:
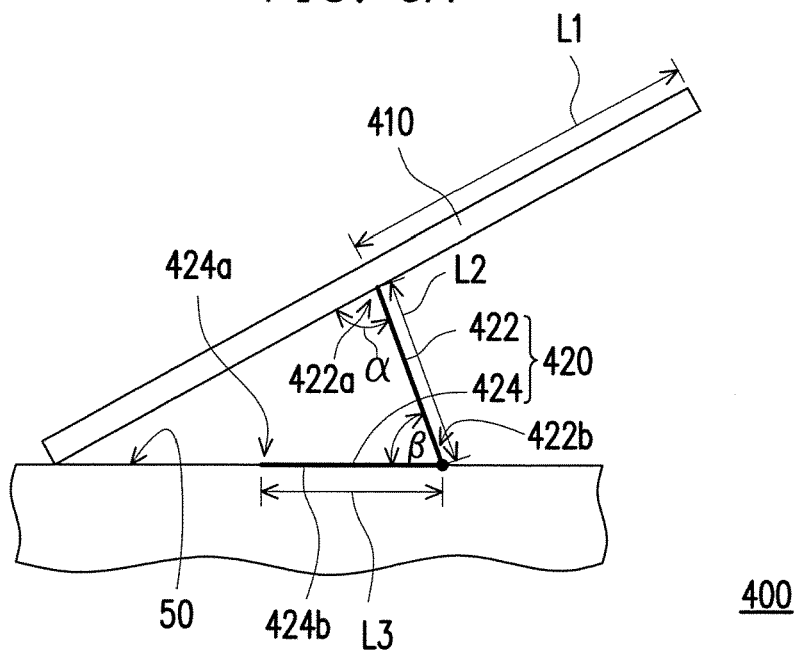
FIG. 9B illustrates bending of a stand of FIG. 9A.

FIG. 9A is a schematic diagram of an electronic device according to another embodiment of the invention. FIG. 9B illustrates bending of the stand of FIG. 9A. Configurations and function methods of a body 410 and a stand 420 of FIG. 9A and FIG. 9B are similar to that of the body 110 and the stand 120 of FIG. 1A and FIG. 1B, so that details thereof are not repeated. A difference between the electronic device 400 and the electronic device 100 is that the stand 420 includes a first section 422 and a second section 424. An end 422a of the first section 422 can be rotatably connected to the body 410, and the second section 424 can be rotatably connected to another end 422b of the first section 422. In this way, the user may not only completely expand the second section 424 from the first section 422 to use a free end 424a of the second section 424 to stand on a desktop 50 as shown in FIG. 9A, the user may also bend the second section 424 relative to the first section 422 to use a surface 424b of the second section 424 to stand on the desktop 50 (or user's lap), so as to improve usage flexibility and stand stability of the stand 420.

Further, according to the aforementioned design method of the stand 420, under a situation that an expanding angle α of the first section 422 of the stand 420 relative to the body 410 is not changed, the body 410 may have different tilt angles as shown in FIG. 9A and FIG. 9B. In the present embodiment, the expanding angle α of the first section 422 relative to the body 410 is, for example, between 30 degrees and 80 degrees, and a relative expanding angle β of the first section 422 and the second section 424 shown in FIG. 9B is between 30 degrees and 70 degrees, though the invention is not limited thereto. Moreover, as shown in FIG. 9B, a ratio of a length L1 between a connection point of the stand 420 and the body 410 and a top end of the body 410, a length L2 of the first section 422 and a length L3 of the second section 424 can be 2:1:1, though the invention is not limited thereto. In other embodiments, the ratio of the length L1, the length L2 and the length L3 can be 1:1:1 or other proper proportional relationships.

In summary, in the electronic device of the invention, the sliding member is disposed on the body, and the sliding member has the stopping portion used for stopping the stand and the pushing portion used for pushing the stand. When the user does not use the stand, the sliding member cam be located at the first position on the body, and the stopping portion of the sliding member limits the stand to be unable to expand from the body, so as to avoid unexpected expansion of the stand. When the user wants to use the stand, the user moves the sliding member away from the first position, such that the stopping portion of the sliding member releases the stand and the pushing portion of the sliding member pushes the stand to expand from the body. Namely, the user may operate the sliding member to make the stand to automatically expand from the body without directly pulling the stand by hand, such that usage convenience of the stand is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An electronic device, comprising:
    a body;
    a stand, rotatably connected to the body; and
    a sliding member, slidably disposed on the body and having at least one stopping portion and at least one pushing portion, wherein when the sliding member is located at a first position, the stopping portion interferes with the stand to stop the stand from expanding from the body, and when the sliding member slides relative to the body to move away from the first position, the stopping portion releases the stand and the pushing portion pushes the stand to drive the stand to rotate and expand from the body.

2. The electronic device as claimed in claim 1, wherein when the sliding member slides relative to the body to move from the first position to a second position, the stopping portion releases the stand and the pushing portion contacts the stand, and when the sliding member slides relative to the body to move from the second position to a third position, the pushing portion pushes the stand to drive the stand to rotate and expand from the body.

3. The electronic device as claimed in claim 2, wherein the second position is located between the first position and the third position.

4. The electronic device as claimed in claim 1, wherein the stand has a recess portion, and when the sliding member is located at the first position, the stopping portion inserts into the recess portion.

5. The electronic device as claimed in claim 1, wherein the stand has a convex portion, and the pushing portion is adapted to push the convex portion to drive the stand to rotate and expand from the body.

6. The electronic device as claimed in claim 5, wherein the stand has a free end, and the stand is adapted to rotate relative to the body along a rotation axis to make the free end to be away from the body, and the convex portion is located between the rotation axis and the free end.

7. The electronic device as claimed in claim 1, further comprising:
    an elastic member, configured on the body, wherein when the sliding member is located at the first position, the stand contacts the elastic member, and resists an elastic force of the elastic member for closing to the body, and when the sliding member moves away from the first position, the stand is adapted to expand from the body through the elastic force of the elastic member.

8. The electronic device as claimed in claim 1, further comprising:
    a magnetic member set, configured between the sliding member and the stand or between the body and the stand, wherein the magnetic member set is adapted to generate a magnetic attraction force to stop the stand from expanding from the body, or adapted to generate a magnetic repulsion force to drive the stand to expand from the body.

9. The electronic device as claimed in claim 8, wherein the magnetic member set comprises two magnetic members, and the two magnetic members are respectively configured on the sliding member and the stand, and when the sliding member is located at the first position, the two magnetic members are aligned to each other to generate the magnetic attraction force.

10. The electronic device as claimed in claim 8, wherein the magnetic member set comprises two magnetic members, and the two magnetic members are respectively configured on the body and the stand, and the two magnetic members are aligned to each other to generate the magnetic attraction force.

11. The electronic device as claimed in claim 8, wherein the magnetic member set comprises two magnetic members, and the two magnetic members are respectively configured on the sliding member and the stand, and when the sliding member moves away from the first position, the two magnetic members are aligned to each other to generate the magnetic repulsion force.

12. The electronic device as claimed in claim 1, wherein the sliding member is a cover and coves at least a part of a back surface of the body.

13. The electronic device as claimed in claim 1, wherein the sliding member has two sliding portions, and the two sliding portions are respectively and slidably disposed on two end portions of the body opposite to each other.

14. The electronic device as claimed in claim 1, further comprising:
   a linkage mechanism, connected between the two sliding portions and the body to make the two sliding portions to side synchronously.

15. The electronic device as claimed in claim 1, wherein the stand comprises a first section and a second section, an end of the first section is rotatably connected to the body, and the second section is rotatably connected to another end of the first section.

* * * * *